(12) United States Patent
Appanna et al.

(10) Patent No.: US 7,801,135 B2
(45) Date of Patent: Sep. 21, 2010

(54) TRANSPORT PROTOCOL CONNECTION SYNCHRONIZATION

(75) Inventors: Chandrashekhar Appanna, Cupertino, CA (US); Anantha Ramaiah, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1060 days.

(21) Appl. No.: 11/134,686

(22) Filed: May 19, 2005

(65) Prior Publication Data

US 2006/0262734 A1 Nov. 23, 2006

(51) Int. Cl.
*H04L 12/56* (2006.01)
(52) U.S. Cl. .................. 370/390; 370/395.3; 370/254
(58) Field of Classification Search .............. 370/254, 370/216, 389, 219, 282, 229, 469, 242, 390; 370/395.3; 714/4; 709/213, 230
See application file for complete search history.

(56) References Cited

U.S. PATENT DOCUMENTS

| | | | |
|---|---|---|---|
| 6,108,300 A | 8/2000 | Coile et al. | |
| 6,366,558 B1 | 4/2002 | Howes et al. | |
| 6,665,304 B2 | 12/2003 | Beck et al. | |
| 6,704,278 B1 | 3/2004 | Albert et al. | |
| 6,747,975 B1* | 6/2004 | Howell et al. | 370/395.3 |
| 6,934,875 B2 | 8/2005 | Kashyap | |
| 7,522,597 B2* | 4/2009 | Chang et al. | 370/390 |
| 2002/0161848 A1* | 10/2002 | Willman et al. | 709/213 |
| 2003/0014684 A1 | 1/2003 | Kashyap | |
| 2003/0140155 A1* | 7/2003 | Harvey et al. | 709/230 |
| 2004/0268175 A1* | 12/2004 | Koch et al. | 714/4 |
| 2005/0086342 A1 | 4/2005 | Burt et al. | |
| 2005/0117529 A1* | 6/2005 | Ramos-Escano et al. | 370/282 |
| 2005/0213498 A1* | 9/2005 | Appanna et al. | 370/216 |
| 2006/0029000 A1* | 2/2006 | Waldvogel | 370/254 |
| 2006/0062142 A1* | 3/2006 | Appanna et al. | 370/219 |
| 2006/0159011 A1* | 7/2006 | Dalal et al. | 370/220 |

OTHER PUBLICATIONS

Information Sciences Institute, "Transmission Control Protocol, DARPA Internet Program, Protocol Specification", dated Sep. 1981, prepared for Defense Advanced Research Projects Agency, 178 pgs.

* cited by examiner

*Primary Examiner*—Kwang B Yao
*Assistant Examiner*—Syed Bokhari
(74) *Attorney, Agent, or Firm*—Hickman Palermo Truong & Becker LLP

(57) ABSTRACT

A system and method supporting synchronization of replicated transport layer connections in a redundant processor telecommunications network element. One method involves receiving, at a network element comprising an active transport protocol process coupled to a standby transport protocol process, information identifying a newly created transport layer connection maintained at the active transport protocol process; assigning a unique connection identifier to the transport layer connection; sending the unique connection identifier, in association with other, protocol-specific connection identifying information, to the standby protocol process; and sending, to the standby transport protocol process, one or more messages comprising one or more properties or statistics associated with the transport layer connection, wherein the messages identify the transport layer connection using the unique connection identifier.

31 Claims, 8 Drawing Sheets

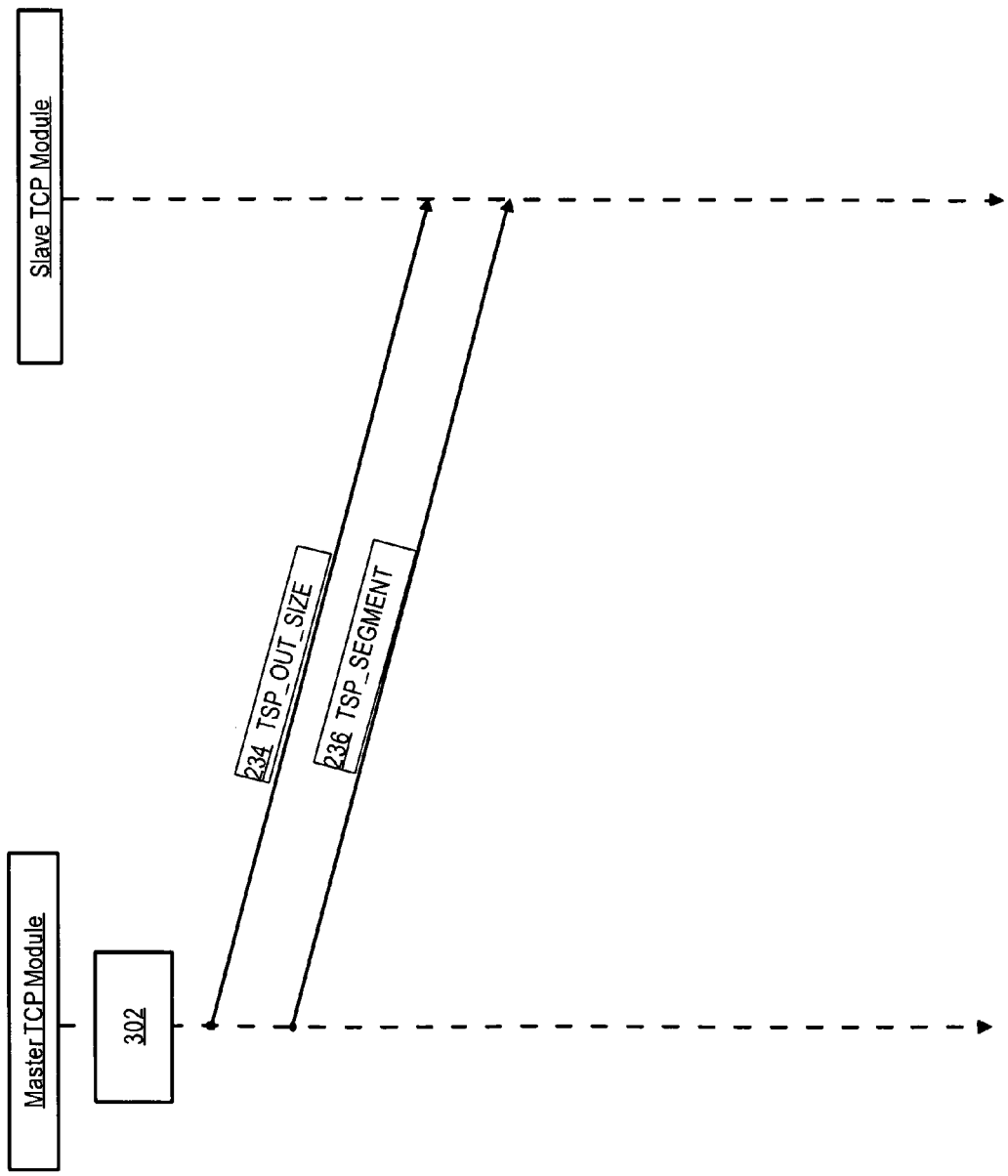

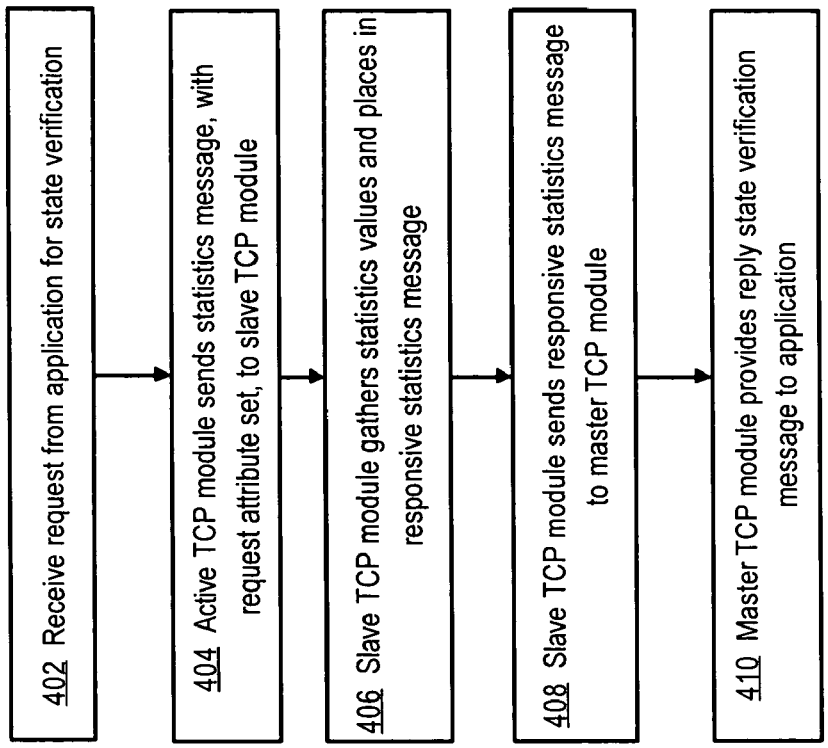

Fig. 4

402 Receive request from application for state verification

404 Active TCP module sends statistics message, with request attribute set, to slave TCP module 406 Slave TCP module gathers statistics values and places in responsive statistics message 408 Slave TCP module sends responsive statistics message to master TCP module 410 Master TCP module provides reply state verification message to application

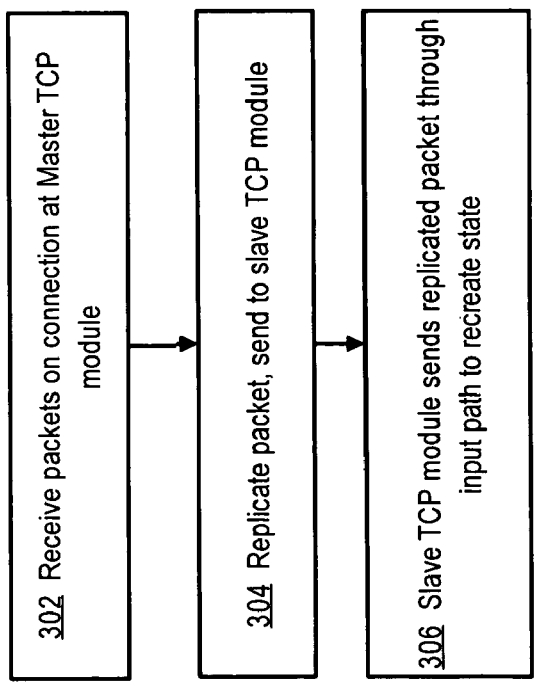

Fig. 3

302 Receive packets on connection at Master TCP module

304 Replicate packet, send to slave TCP module

306 Slave TCP module sends replicated packet through input path to recreate state

TRANSPORT PROTOCOL CONNECTION SYNCHRONIZATION

CROSS-REFERENCE TO RELATED APPLICATIONS

This application is related to co-pending, commonly assigned application Ser. No. 10/808,040, filed Mar. 24, 2004, entitled "Routing system and method for transparently recovering routing states after a failover or during a software upgrade," of Chandrashekhar Appanna et al., and to co-pending, commonly assigned application Ser. No. 10/948,732, filed Sep. 22, 2004, entitled "Cooperative TCP/BGP Window Management For Stateful Switchover," of Chandrashekhar Appanna et al.

FIELD OF THE INVENTION

The present invention generally relates to providing high availability or fault-tolerant transport layer connections in telecommunication networks. The invention relates more specifically to approaches for synchronizing state information relating to Transport Connection Protocol (TCP) connections in routers and switches that use redundant TCP processes.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Border Gateway Protocol (BGP) is a path vector routing protocol for inter-Autonomous System routing. The function of a BGP-enabled network element (a BGP host or peer) is to exchange network reachability information with other BGP-enabled network elements. The most commonly implemented version of BGP is BGP-4, which is defined in RFC1771 (published by the Internet Engineering Task Force (IETF) in March 1995).

To exchange routing information, two BGP hosts first establish a peering session by exchanging BGP OPEN messages. The BGP hosts then exchange their full routing tables. After this initial exchange, each BGP host sends to its BGP peer or peers only incremental updates for new, modified, and unavailable or withdrawn routes in one or more BGP UPDATE messages. A route is defined as a unit of information that pairs a network destination with the attributes of a network path to that destination. The attributes of the network path include, among other things, the network addresses (also referred to as address prefixes or just prefixes) of the computer systems along the path. In a BGP host, the routes are stored in a Routing Information Base (RIB). Depending on the particular software implementation of BGP, a RIB may be represented by one or more routing tables. When more than one routing table represents a RIB, the routing tables may be logical subsets of information stored in the same physical storage space, or the routing tables may be stored in physically separate storage spaces.

As networks grow more complex and the number of BGP routes maintained by a particular element increases, the consequences of the failure of a BGP host device, or the BGP process that it hosts, become more severe. For example, in some scenarios a BGP failure may require retransmission of a large amount of route information and re-computation of a large amount of network reachability information. Therefore, vendors of network gear and their customers wish to deploy BGP in a fault-tolerant manner.

BGP commonly runs on and uses the Transmission Control Protocol (TCP) as defined in RFC 793, which provides a connection-oriented, reliable data delivery service for applications such as BGP. Having highly available, reliable TCP connections that can be switched over in the face of failure is a foundation requirement for providing BGP with high availability. TCP is a stateful protocol that provides reliable datagram delivery, flow control, and congestion control for higher-order applications. To provide these services, a TCP implementation maintains state data that includes variables, such as window sizes, round trip time, etc.; a re-transmission queue containing copies of segments that have been sent but not yet acknowledged; and timers. A successful switchover to a secondary processor of TCP requires timely synchronization of such state data to the secondary processor.

Highly reliable networks offer high availability by detecting failures and handling the failures in a timely manner with zero or minimal disruption of service. Redundant systems that have at least one secondary processor are often used to achieve high reliability. When the secondary processor is synchronized to the primary processor, and can take over with almost no visible interruption to peer devices, the secondary processor is termed a "hot standby" and the switchover is termed "stateful switchover" or SSO.

SSO can be implemented in a telecommunication network with network elements that have dual route processors, each of which can host separate but duplicate instances of various software applications. One route processor is deemed Active and the other is deemed Standby. When the processors are operating in SSO mode, the active route processor automatically replicates all messages that it receives or sends, for all protocols or activities, and sends the replicated messages to the standby route processor.

In some embodiments, the active route processor periodically sends a bulk copy of data representing a particular state (a "checkpoint") to the standby route processor. While replication and checkpointing enable the standby route processor to achieve synchronization of state with the active route processor, these approaches require considerable use of processing resources and memory, and require extensive use of an inter-processor communication mechanism. When a route processor is managing a large number of BGP sessions and TCP connections, the burden of continually operating in SSO mode may become unacceptable.

As networks grow larger and more complex, network reliability and throughput depends to a greater extent upon the availability of software processes that implement BGP. For example, when a BGP host becomes unavailable, many other BGP peers may need to re-compute route information to account for the unavailability. Other hosts may lose BGP connectivity during the transition. Thus, present approaches for managing BGP sessions in large networks without SSO capability cause significant network churn. Network administrators are demanding a better solution that does not perturb the network.

Moreover, BGP is merely one example of an application for which high availability is desirable; there are many other applications. BGP and other applications running on top of transport-layer protocols, such as TCP, would benefit greatly from a solution providing true SSO for the TCP connections, achieved in a scalable manner.

Further, users and administrators expect any SSO support for TCP to provide a solution that performs well and scales to large networks that use existing and future platforms without major hardware upgrades.

One approach for providing high-availability TCP involves massive data checkpointing of send and receive windows and related metadata for all established TCP connections. While this approach does allow active and standby processors to maintain identical TCP state information, it is a "brute-force" approach that requires extensive CPU resources. Network administrators desire to have a more efficient approach that is readily scalable to large numbers of connections.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2B and FIG. 2C are message ladder diagrams showing the use of messages according to one embodiment of a TCP synchronization protocol;

FIG. 3 is a flow diagram that shows one embodiment of a packet replication process;

FIG. 4 is a flow diagram that shows one embodiment of a state verification process;

DETAILED DESCRIPTION

Figure 1A:
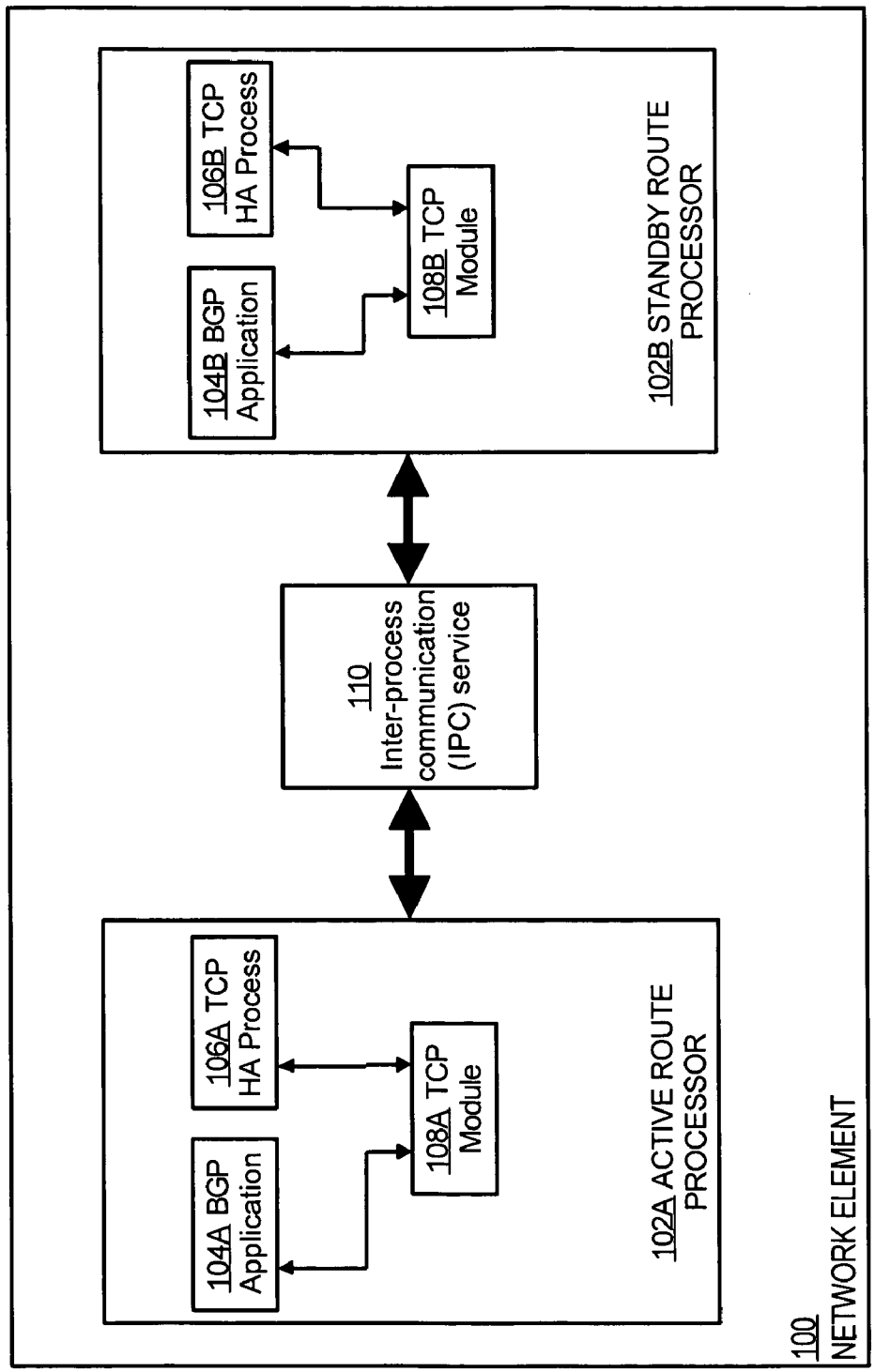
FIG. 1A is a block diagram that illustrates an overview of a network element that may be used to implement an embodiment.

A method and apparatus for synchronizing network transport layer connections are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Method, System and Protocol for Transport Protocol Connection Synchronization
  2.1 Structural and Functional Overview
  2.2 Packet Replication
  2.3 State Verification
  2.4 Benefits Of Certain Embodiments
3.0 Implementation Mechanisms-Hardware Overview
4.0 Extensions and Alternatives 1.0 General Overview The needs identified in the foregoing Background, and other needs and objects that will become apparent for the following description, are achieved in the present invention, which comprises, in various aspects, a system and method supporting synchronization of replicated transport layer connections in a redundant processor telecommunications network element. One aspect is a method that involves receiving, at a network element comprising an active transport protocol process coupled to a standby transport protocol process, information identifying a newly created transport layer connection maintained at the active transport protocol process; assigning a unique connection identifier to the transport layer connection; sending the unique connection identifier, in association with other, protocol-specific connection identifying information, to the standby protocol process; and sending, to the standby transport protocol process, one or more messages comprising one or more properties or statistics associated with the transport layer connection, wherein the messages identify the transport layer connection using the unique connection identifier.

According to one feature of this aspect, the messages conform to a specified transport protocol synchronization message format and are not TCP segments.

According to another feature, both the active transport protocol process and the standby transport protocol process implement TCP.

In yet another feature, the protocol-specific connection identifying information comprises a source address value, destination address value, source port value, and destination port value. In still another feature, the standby transport protocol process notifies a logically higher application that the transport protocol connection is available only after receiving the one or more messages and an end message that signals an end of the one or more messages.

In one feature, the active transport protocol process notifies a logically higher application that the transport protocol connection is available only after receiving a completion message from the standby transport protocol process. In still another feature, the one or more messages comprise any of egress properties, ingress properties, rate properties, statistics, or options associated with the transport protocol connection.

According to a further feature the active transport protocol process receives a request for state verification, the active transport protocol process sends a request for statistics to the standby transport protocol process, the standby transport protocol process retrieves one or more statistics values, the standby transport protocol process sends a responsive statistics message comprising the one or more statistics values to the active transport protocol process, and the transport protocol process sends a reply message comprising the statistics values to a logically higher application.

In other aspects, the invention encompasses a computer apparatus and a computer-readable medium configured to carry out the foregoing steps.

2.0 Example Method, System and Protocol for Transport Protocol Connection Synchronization 2.1 Structural and Functional Overview FIG. 1A is a block diagram that illustrates an overview of a network element that may be used to implement an embodiment. A network element 100 comprises an active route processor 102A and a standby route processor 102B arranged in a redundant or fault-tolerant configuration. In one embodiment, network element 100 is a dual-processor router or switch that participates in a packet-switched network or internetwork. Active route processor 102A hosts a TCP module 108A that runs or controls a TCP high-availability (HA) process 106A and a BGP application 104A. Standby route processor 102B hosts a TCP module 108B, BGP application 104B, and TCP HA process 106B.

TCP modules 108A, 108B and TCP HA processes 106A, 106B provide transport control protocol functionality. BGP application 104A, 104B provide border gateway protocol functionality. In alternative embodiments, active route processor 102A and standby route processor 102B may host other protocols and applications. Thus, TCP modules 108A, 108B, TCP HA processes 106A, 106B, and BGP application 104A, 104B are shown only as examples and not as requirements.

An inter-process communication (IPC) service 110 is coupled between active route processor 102A and standby route processor 102B, and provides a means for the route processors to exchange data and instructions.

In one embodiment, network element 100 is implemented as one of the Cisco 10000 Series Routers, commercially available from Cisco Systems, Inc., and alternatively as a Cisco CRS-1 Carrier Routing System The arrangement of FIG. 1A represents just one possible context for applying the approaches described herein.

The approaches herein provide an architecture comprising multiple techniques to achieve SSO for TCP connections that will perform and scale well on current and future router platforms without requiring special hardware assistance. Generally, the adaptive TCP SSO architecture proposed herein implements a high availability TCP module that will extract the events necessary for providing SSO functionality for TCP connections based on system behavior and then signal the events to a standby TCP module. The standby TCP module uses the events to recreate state data that is identical in form and function to the state data at the active TCP module. Applications that use or run on TCP connections also participate in certain respects. With this approach, a scalable, efficient and useful TCP SSO support implementation is made possible by providing an architecture that can adapt to the needs of TCP applications, and can be tuned based on application needs and strengths.

Figure 1B:
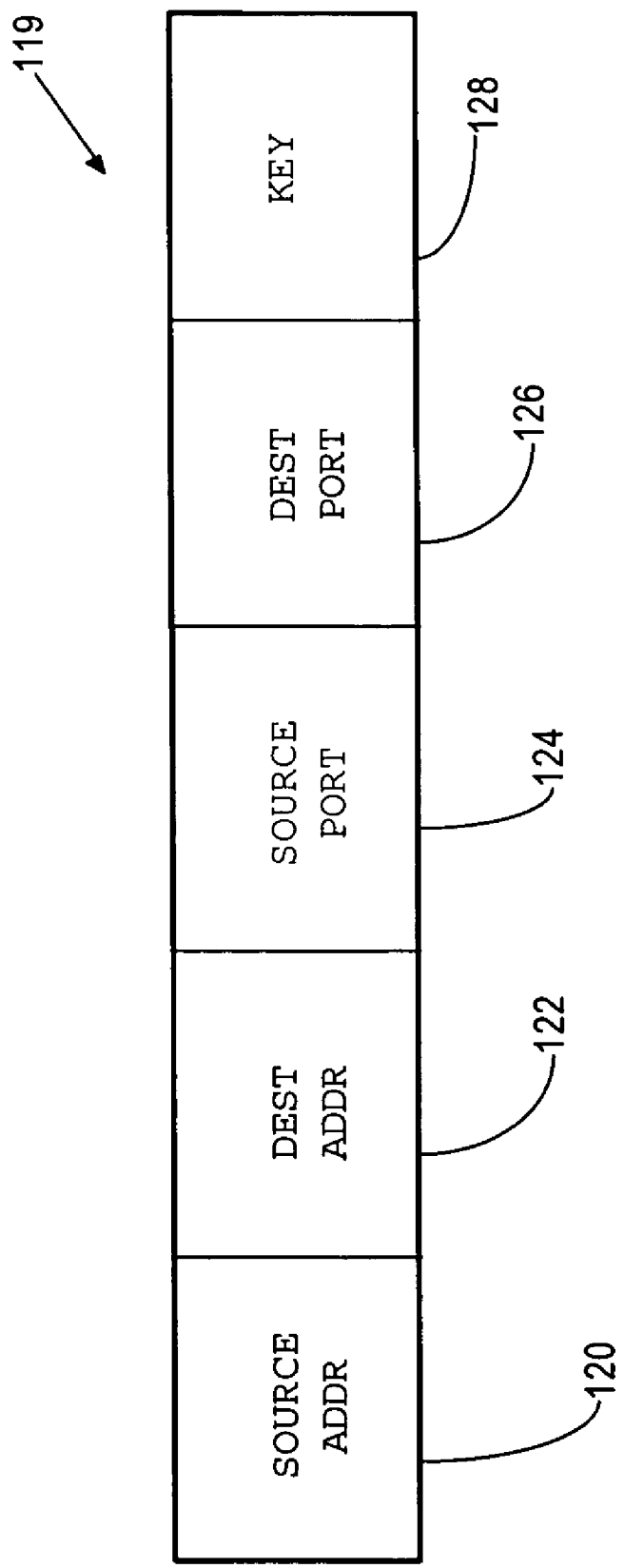
FIG. 1B is a block diagram of a five-tuple of values that conventionally uniquely identify a TCP connection.

FIG. 1B is a block diagram of a five-tuple of values that conventionally uniquely identify a TCP connection. Five-tuple 119 comprises a source address 120, destination address 122, source port 124, destination port 126, and key value 128. The source address 120 and source port 124 identify a sending host that is originating a data communication to a receiving host. The destination address 122 and destination port 126 identify a destination of a TCP segment flow from the sending host. The key value 128 typically comprises an encrypted value that only the sending host and receiving host can decrypt, to protect against attacks. In some embodiments, the key value 128 is an MD5 hash.

While the five-tuple of values can identify a TCP connection unambiguously, communicating all five values multiple times among cooperating processes may consume an unacceptably high amount of bandwidth. Therefore, in an embodiment, the five-tuple is not used, as further described below.

Figure 1C:
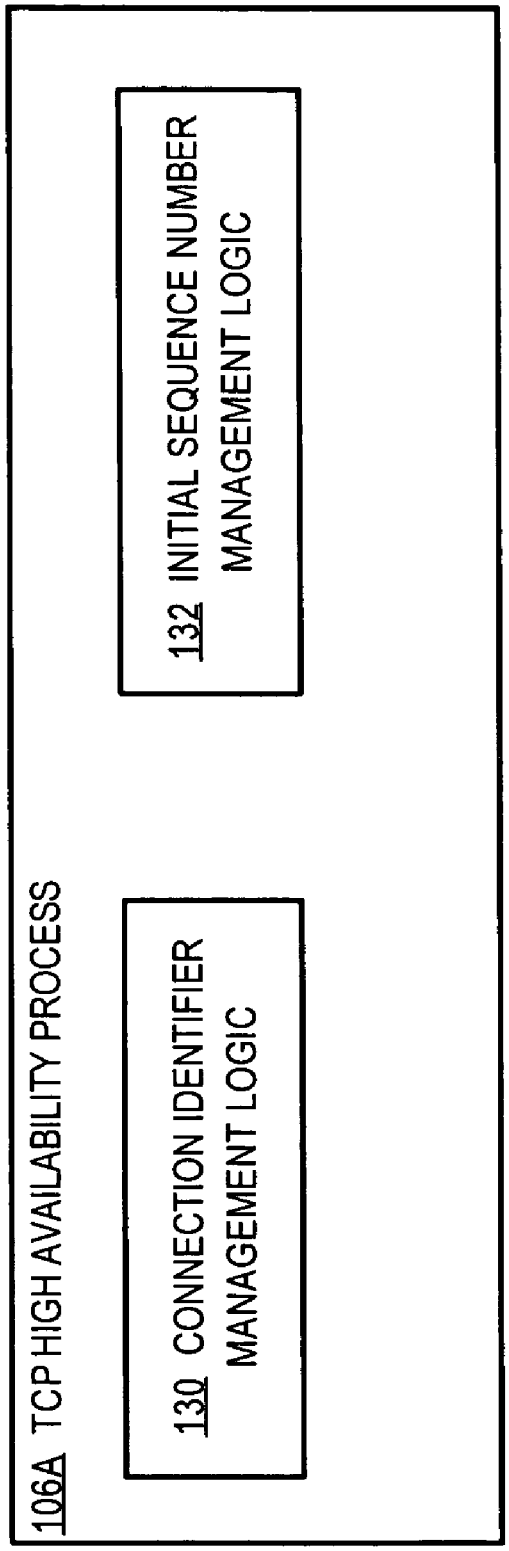
FIG. 1C is a block diagram showing example functional elements in a TCP high availability process.

FIG. 1C is a block diagram showing example functional elements in a TCP high availability process, such as TCP high availability process 106A of FIG. 1A. In one embodiment, TCP high availability process 106A comprises connection identifier management logic 130 and initial sequence number management logic 132. The foregoing elements may be implemented as one or more sequences of computer program instructions, or other software elements, for implementing the functions described herein. Specific logical functions are described in succeeding sections.

Figure 2A:
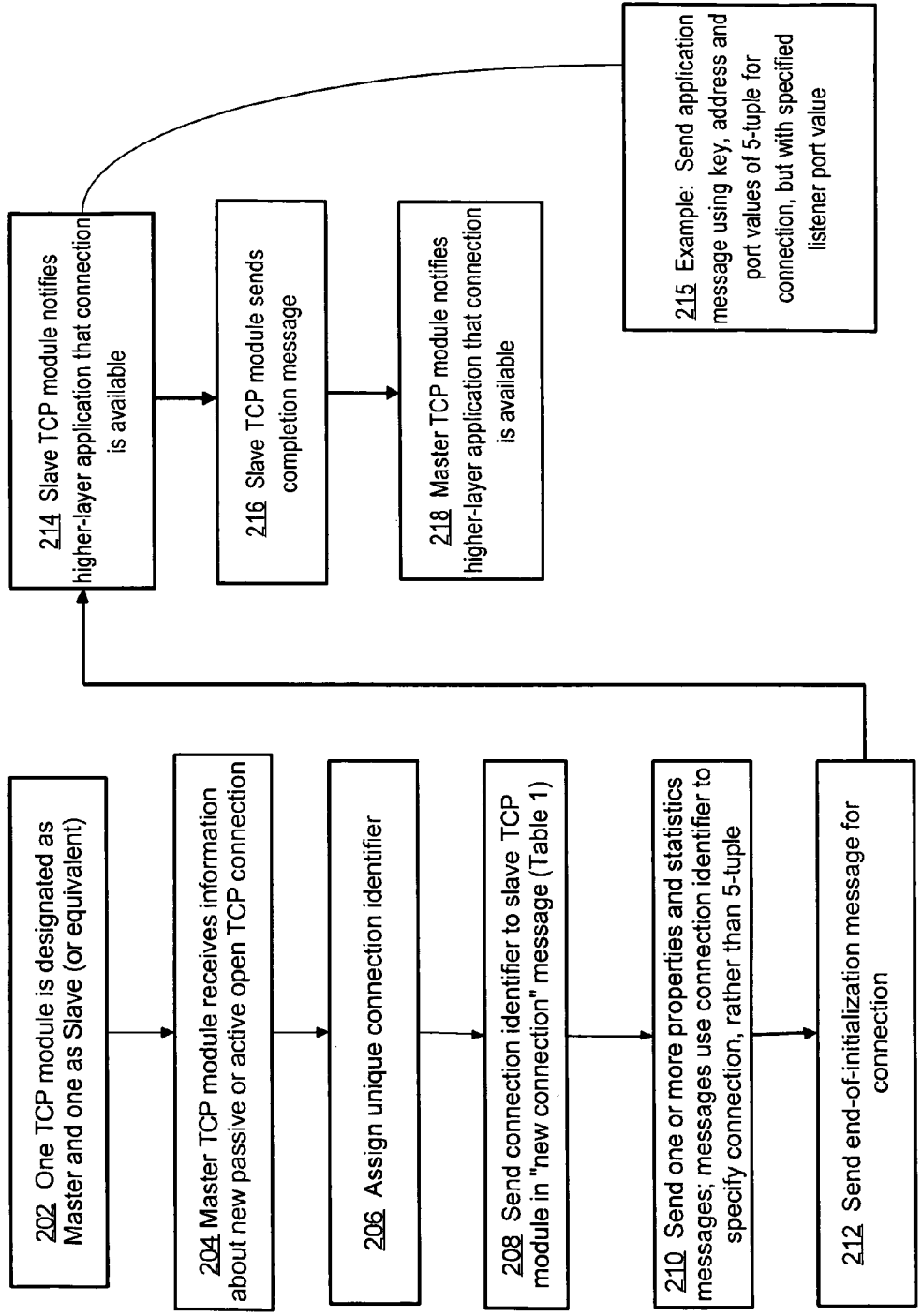
FIG. 2A is a flow diagram that illustrates a high level overview of one embodiment of a method for synchronizing transport layer connections, particularly relating to initializing newly created connections.
Figure 2B:
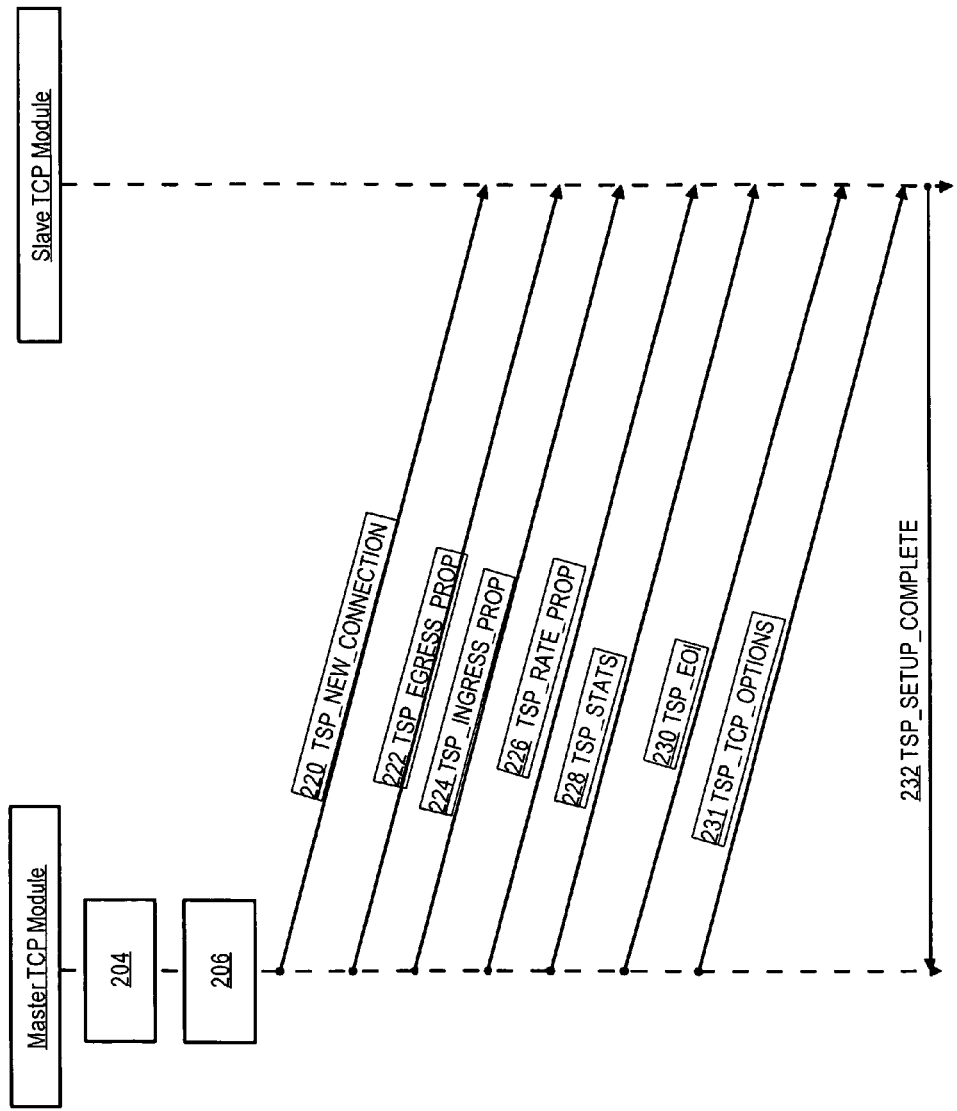

FIG. 2A is a flow diagram that illustrates a high level overview of one embodiment of a method for synchronizing transport layer connections, particularly relating to initializing newly created connections. FIG. 2B and FIG. 2C are message ladder diagrams showing the use of messages according to one embodiment of a TCP synchronization protocol. For illustrating a clear example, this section describes the techniques of FIG. 2A herein within the context of TCP as a transport layer protocol. However, the approach of FIG. 2A is broadly applicable to other transport layer protocols, such as Stream Control Transmission Protocol (SCTP), etc.

At step 202, one TCP module is designated as a Master module and another TCP module is designated as a Slave module, or the equivalent. For example, in network element 100 of FIG. 1A, active TCP module 108A may be designated as Master and standby TCP module 108B may be designated as Slave. The designation may occur through a configuration file, through a configuration command, through an election process that initiates when the TCP modules initiate operation, or any other designation technique. The specific method of designation is not important. What is important is simply that one TCP module assumes responsibility for managing connection identifiers for connections.

In one embodiment, the Master TCP module also manages assignment of initial sequence numbers (ISNs) to connections using initial sequence number management logic 132. The Master TCP module is responsible to generate an ISN because the ISN is the starting value for a TCP connection, and must be the same at both endpoints. However, an embodiment does not require synchronizing ISN generation or other techniques that may compromise the security of TCP or a connection. For example, in an alternative embodiment, the Master TCP module and the Slave TCP module each may independently generate an ISN, and the Slave TCP module may maintain the difference of the two ISN values. The Slave TCP module would then add the difference to each subsequent sequence number for the TCP connection.

For example, assume that the ISN at the Master TCP module is 100 and the ISN at the Slave TCP module is 200. The difference is 100. After 500 bytes of data are sent, the Master TCP module sequence number ("sndnxt") is 100+500=600. The Slave TCP module would compute the sequence number as 200+500-100=600. Thus, both Master and Slave hold the same sequence number.

At step 204, the Master TCP module receives information about a new passive or active open TCP connection. For example, connection identifier management logic 130 receives information from a TCP stack incorporated in the Master TCP module 108A indicating that a new TCP connection has reached the ESTABLISHED state as that state is defined in RFC 793.

At step 206, a unique connection identifier is assigned to the new connection. Assigning a connection identifier may involve allocating a value and associating the value with the connection. Allocating a value may involve randomly determining a value, selecting a value from a pool of available values, etc. Associating the value with a connection may comprise storing the connection identifier in a table with the values of five-tuple 119 (FIG. 1B) for the connection, storing the connection identifier in a property attribute of a TCP control block (TCB) for the connection, etc.

At step 208, the Master TCP module sends the connection identifier, with other connection identifying information, to the Slave TCP module in a "new connection" message. The other connection identifying information may comprise the five-tuple 119 for the new connection; thus, step 208 effectively transfers the association of the unique connection identifier selected by the Master TCP module and a TCP connection to the Slave TCP module. Further, the approach of FIG.

2A, step 208 does not require checkpointing all data that is actually carried in TCP segments that are received at the active TCP module 108A as part of an established TCP connection. Therefore, the present approach achieves far greater efficiency and scalability than past approaches.

The "new connection" message, and other messages described herein, may comprise an IPC message that is sent using IPC service 110 (FIG. 1A).

Alternatively, messages of steps 208, 210, 212, 216 are sent from between the Master TCP module and the Slave TCP module directly, without passing down other stack layers. When an implementation is structured according to the seven-layer Open Systems Interconnect (OSI) model of network software, the Master TCP module may reside conceptually at the transport layer of software hosted at the active route processor and a TCP peer signaling layer may be coupled to the transport layer. The TCP peer-signaling layer establishes a messaging connection directly to a counterpart peer-signaling layer associated with a transport layer of the standby processor. The Master TCP module can send messages directly to the Slave TCP module through the TCP peer signaling layers without traversing lower layers such as the network layer (which may implement IP), data link layer, or physical layer.

In one embodiment, each such message conforms to a TCP Synchronization Protocol (TSP) and is termed a TSP message. In one embodiment, each TSP message comprises a type field, length field, connection identifier field, and reserved field. In one embodiment, the type field carries a type value that refers to one of the example message types shown in Table 1.

TABLE 1

| EXAMPLE MESSAGE TYPES |
| --- |
| TSP_NEW_CONNECTION |
| TSP_EGRESS_PROPERTIES |
| TSP_INGRESS_PROPERTIES |
| TSP_RATE_PROPERTIES |
| TSP_STATS |
| TSP_SETUP_COMPLETE |
| TSP_EOI |
| TSP_OUT_SIZE |
| TSP_SEGMENT |
| TSP_TCP_OPTIONS |

In one embodiment, the type field is one octet in length. The length field indicates total message length including the header. The connection identifier field carries a connection identifier value as assigned at step 206. The reserved field comprises one or more bits that are reserved for future use or expansion of the protocol. In one embodiment, the reserved field is two octets in length.

A "new connection" message as sent in step 208 may comprise a TSP_NEW_CONNECTION message 220 as shown in FIG. 2B. A TSP_NEW_CONNECTION message may comprise the example fields specified in Table 2.

TABLE 2

| EXAMPLE FIELDS OF TSP_NEW_CONNECTION MESSAGE | |
| --- | --- |
| FIELD | OCTETS |
| TSP HEADER | 7 |
| LOCAL PORT | 2 |
| LOCAL ADDRESS | 4 |
| DESTINATION PORT | 2 |
| DESTINATION ADDRESS | 4 |
| TABLEID | 2 |
| SENDER ISN | 4 |
| RECEIVER ISN | 4 |
| LISTEN PORT | 2 |

The TableID field may carry the value of a unique connection identifier described above. The Listen Port field carries the value of a specified port on which an application listens for TSP information.

At step 210 of FIG. 2A, the Master TCP module sends one or more properties and statistics messages. Each of the messages sent at step 210 uses only the connection identifier to reference and identify a TCP connection, and not the five-tuple 119. Consequently, the messages sent at step 210 consume far less IPC bandwidth than they would if the entire five-tuple 119 were sent for each message. About five times less IPC bandwidth may be consumed in an embodiment.

As shown in FIG. 2B, the messages of step 210 may comprise TSP_EGRESS_PROPERTIES message 222, TSP_INGRESS_PROPERTIES message 224, TSP_RATE_PROPERTIES message 226, TSP_STATS message 228, and an end-of-initialization message termed TSP_EOI message 230. The particular messages of step 210 may vary according to properties of the TCP connection. For example, some of the messages are required to convey essential TCP characteristics, while other messages are optional because they reflect non-essential information such as statistics and option state. As a particular example, TCP SACK option values are advisory, and if they are not established for a particular connection then they are not transferred at step 210. Failure to transfer such values to the Slave TCP Module before a fault switchover is not critical.

Each message of step 210 transfers a particular group of TCP connection properties. For example, the TSP_EGRESS_PROPERTIES message comprises initial send parameter values that are internally used in a TCP implementation, such as "sndwnd" and "sndcwnd." The messages of step 210 may be sent together at one time or individually at different times. For example, based on typical operation of a TCP implementation, the TCP_EGRESS_PROPERTIES message needs to be sent only once. Thereafter, the "sndwnd" and "sndcwnd" values would be adjusted at the Slave TCP module upon receiving any following segments when application TCP segments are in the re-transmission queue. That is, the TCP_EGRESS_PROPERTIES message is sent once, and when successive TCP segments are replicated and forwarded to the Slave TCP module, the Slave TCP module can create state data identical to corresponding Master TCP module state data by feeding the successive TCP segments through the TCP state machine of the Slave TCP module. Further information about packet and segment replication, and state synchronization, is provided in later sections.

The messages of step 208, 210 carry values that are universally used in TCP implementations, but the values that are carried are independent of the internal implementation details of a particular TCP stack or module. As a specific example, a TSP_EGRESS_PROPERTIES message carries properties of a connection in the outbound direction based on RFC 793, independent of the underlying implementation, and may comprise the example fields specified in Table 3.

TABLE 3

EXAMPLE FIELDS OF TSP_EGRESS_PROPERTIES MESSAGE

| FIELD | OCTETS |
|---|---|
| TSP HEADER | 7 |
| SEND UNACKNOWLEDGED | 4 |
| SEND NEXT | 4 |
| SEND WINDOW | 4 |
| SEQNO FOR LAST WINDOW UPDATE | 4 |
| ACK NO FOR LAST WINDOW UPDATE | 4 |
| MAX SEND WINDOW | 4 |
| CONGESTION WINDOW | 4 |
| SLOW START THRESHOLD | 4 |

In one embodiment, the Master TCP module modifies the sequence number values that are sent in the TSP_EGRESS_PROPERTIES message to accommodate any TSP_SEGMENT or TSP_OUTSIZE messages that may follow because associated packets are already in the re-transmission queue. The form and use of TSP_SEGMENT or TSP_OUTSIZE messages are described further below.

After one or more messages are sent at step 210, an end message is sent. As shown in step 212 (FIG. 2A), the end message indicates an end of initialization of a connection at the Slave TCP module. The TSP_EOI message 230 of FIG. 2B may be used. Sending the end message at step 212 implicitly informs the Slave TCP module that the Master TCP module has sent all necessary information about the connection referenced by the connection identifier.

Having all necessary information about a connection, at step 214, the Slave TCP module notifies an application at a logically higher layer that the connection is available. In an embodiment, standby TCP module 108B notifies standby BGP application 104B that the connection is available. As shown at step 215, in one embodiment, the notification of step 214 may comprise sending a message to the higher application using the five-tuple 119 of the new connection, substituting a port value associated with a specified listener port of the application. Thus, in the alternative of step 215, the application is expected to implement a listener process on the specified port to receive notifications that ports are available.

At step 216, the Slave TCP module sends a completion message to the Master TCP module. In one embodiment, the TSP_SETUP_COMPLETE message 232 of FIG. 2B is sent. The completion message implicitly informs the Master TCP module that the Slave TCP module has established the new connection, and notified any listening higher layer application.

Having been informed that an application at the slave side is aware that the connection is available, at step 218, the Master TCP module notifies a higher layer application on its side that the connection is available. For example, Active TCP HA process 106A or Active TCP module 108A informs Active BGP application 104A that the connection is available. This approach enables the application associated with the Master TCP module to consider the connection available only when the connection is also established and available at the Slave TCP module.

In one embodiment, the processing order of messages of steps 208, 210, 212, 216 is defined as first-in first-out. That is, TSP messages as defined herein should be processed at the Slave TCP module in the order in which the Master TCP module sends the messages. Therefore, IPC facility 110, a peer-to-peer signaling mechanism, or any other transport medium used for exchanging TSP messages should ensure that messages are delivered in transmission order.

2.2 Packet Replication

Once a connection is established at both the Active TCP module and Slave TCP module, all incoming packets received at the Active TCP module are replicated and sent to the Slave TCP module, which recreates state data equivalent to the state maintained by the Active TCP module for the connection.

FIG. 3 is a flow diagram that shows one embodiment of a packet replication process. At step 302, one or more packets encapsulating TCP segments are received at the Master TCP module. At step 304, each packet is replicated and sent to the Slave TCP module. In an embodiment, the replicated packets are sent in messages using IPC facility 110. At step 306, the Slave TCP module receives the replicated packets and sends the TCP segments in the replicated packets through the input path of the TCP state machine implemented in the Slave TCP module. As a result, the Slave TCP module recreates state data equivalent to the state data that the Active TCP module maintains for the connection.

In one embodiment, all outgoing packets are sent to the Slave TCP module encapsulated in a TSP_OUT_SIZE message 234 (FIG. 2C). The TSP_OUT_SIZE message 234 carries all information needed for the Slave TCP module to update its send state variables. In one embodiment, the TSP_OUT_SIZE message 234 comprises dummy application data, and a size value equal to the size value of the actual data received at the Master TCP module.

In another embodiment, the Master TSP module sends an outgoing packet in the form of a TSP_SEGMENT message 236, which is used when the TCP "cwnd" value is less than the size of a protocol data unit (PDU) as defined by a higher layer application. In this case, if the Master TCP module is in the enhanced Nagle mode, which specifies packet coalescence but not fragmentation, then the Master TCP module creates a TSP_SEGMENT message 236 that contains the packet that has been fragmented. The Slave TCP module receives the message and queues the packet in the retransmit queue of the Slave TCP module. This approach enables the Master TCP module to perform fragmentation of application PDUs, while maintaining synchronization with the Slave TCP module.

In the approach of FIG. 3, TCP connection data as received "on the wire" at the Master TCP module serves as a primary driver for generating state information in a TCP state machine for a connection on the Slave TCP module. In an embodiment, all connection data is replicated at the Master TCP module, sent to the Slave TCP module, and processed by the TCP state machine of the Slave TCP module as if the data came from the wire directly to the standby TCP module. This approach exploits the observation that two TCP stacks that are RFC compliant must produce the same end state given the same packet inputs. IPC or the peer-to-peer signaling mechanism transfers packets or events into the TCP state machine on the standby TCP module without involving lower layers.

Further, in one embodiment, higher-layer TCP applications associated with the Slave TCP module can read packets as if the packets are arriving on the connection from the wire. Each TCP connection represented at the Slave TCP module is maintained in a read-only mode, i.e., applications cannot write packets into the connection or send TCP segments using the connection.

2.3 State Verification

Some applications can benefit from mechanisms for retrieving current state information for tracking and verifying states of a TCP state machine, or for retrieving certain data values that the TCP modules use internally. Such verification also provides a way to determine whether communication across IPC or a peer-to-peer signaling layer is reliable—that is, to determine whether the standby TCP module is receiving correct data from the active TCP module.

In one embodiment, TCP high availability process 106A provides mechanisms for applications seeking real-time state verification. For example, in one embodiment, connection identifier management logic 120 includes instructions for periodically checking that the states at the active TCP module and standby TCP module are identical. As one example, the values of TCP state variables such as sndwnd, snduna, rcvnxt, rcvwnd are compared, and an error is thrown if the values are not identical. Further, timer values may be compared within a tolerable skew amount. Application-specific values also may be checked.

In one embodiment, the interval during which such checks are performed is programmable. For example, an interval configuration value may specify that the foregoing state verification checks are performed after a specified number of packets, where the specified number of packets is chosen by the application. In one embodiment, verification checking is not enabled by default, but an application can enable verification checking on a per connection basis. This approach provides logic useful for debugging and fault recovery.

In still another embodiment, TCP high availability process 106A provides an API with a function that enables an application, such as BGP, to determine the sizes of any dummy packets that are in the send queue of the standby TCP module. With this information, the BGP application can generate packets of the same size and provide them to TCP for transmission. The active TCP module then recreates the send queue using the provided packets. This approach ensures that if a receiving peer has any logical holes in its receive window, the window can be filled without problems.

FIG. 4 is a flow diagram that shows one embodiment of a state verification process. At step 402, a request for state verification is received from an application. At step 404, the Active TCP module sends a statistics message, with a request attribute set, to the Slave TCP module. The statistics message may comprise a TSP_STATS message.

At step 406, the Slave TCP module gathers one or more statistics values and places the statistics values in a responsive statistics message. At step 408, the Slave TCP module sends the responsive statistics message, which may be another TSP_STATS message with different attributes set, to the Master TCP module. At step 410, the Master TCP module provides a reply state verification message to the application.

2.4 Benefits of Certain Embodiments

Through these approaches, an embodiment uses intelligent techniques at the TCP level to achieve transparent failover of TCP connections. These approaches provide a foundation for supporting TCP applications, such as BGP, with high availability. The approaches avoid brute force checkpointing, and use intelligent techniques that are applied at the TCP level.

The approaches herein are asynchronous and support servicing multiple connections in parallel. Optional field values can be separated into specific messages that are sent at a deferred time.

The peer-to-peer signaling layer provides faster communication of replicated state data, and enables an implementation to re-use the IP header and the data link layer header of a packet. As a result, efficient packet cloning is provided. In contrast, other approaches employ excessive checkpointing for both send and receive state machine values, these approaches are difficult to scale, and they require sophisticated hardware assistance.

Certain embodiments are useful in the context of performing non-stop routing processes. Such processes are described, for example, in co-pending application Ser. No. 10/808,040, filed Mar. 24, 2004, entitled "Routing system and method for transparently recovering routing states after a failover or during a software upgrade," of Chandrashekhar Appanna et al. The approaches provided herein can support failover of passive open connections, which are TCP connections originating from another BGP peer. The approaches herein also support failover of active open connections, which are TCP connections originating from a particular BGP peer that implements the approaches herein. The approaches herein can handle asymmetric startup, which occurs when a secondary processor initiates operation or is added after a primary process initializes and establishes TCP connections with a peer.

In one embodiment, an application such as BGP can specify whether a connection is highly available and subject to the approaches herein or not. Only for connections that are marked highly available, packets are cloned and sent to the Slave TCP module. Replication and communication of the packets occurs at the transport protocol level. This approach ensures that the inbound packet runs through the standby state machine and is synchronized with the Master TCP module state machine.

The approach herein represents an improvement over brute-force data checkpointing approaches, because TCP state changes for every processed packet, and checkpointing every state change may require excessive use of inter-process communication (IPC) resources. Further, with checkpointing approaches, synchronization becomes difficult for highly different or divergent versions of the TCP software. Moreover, a checkpointing approach cannot result in modifying all local variables that are maintained internally by the standby TCP module.

3.0 Implementation Mechanisms—Hardware Overview

Figure 5:
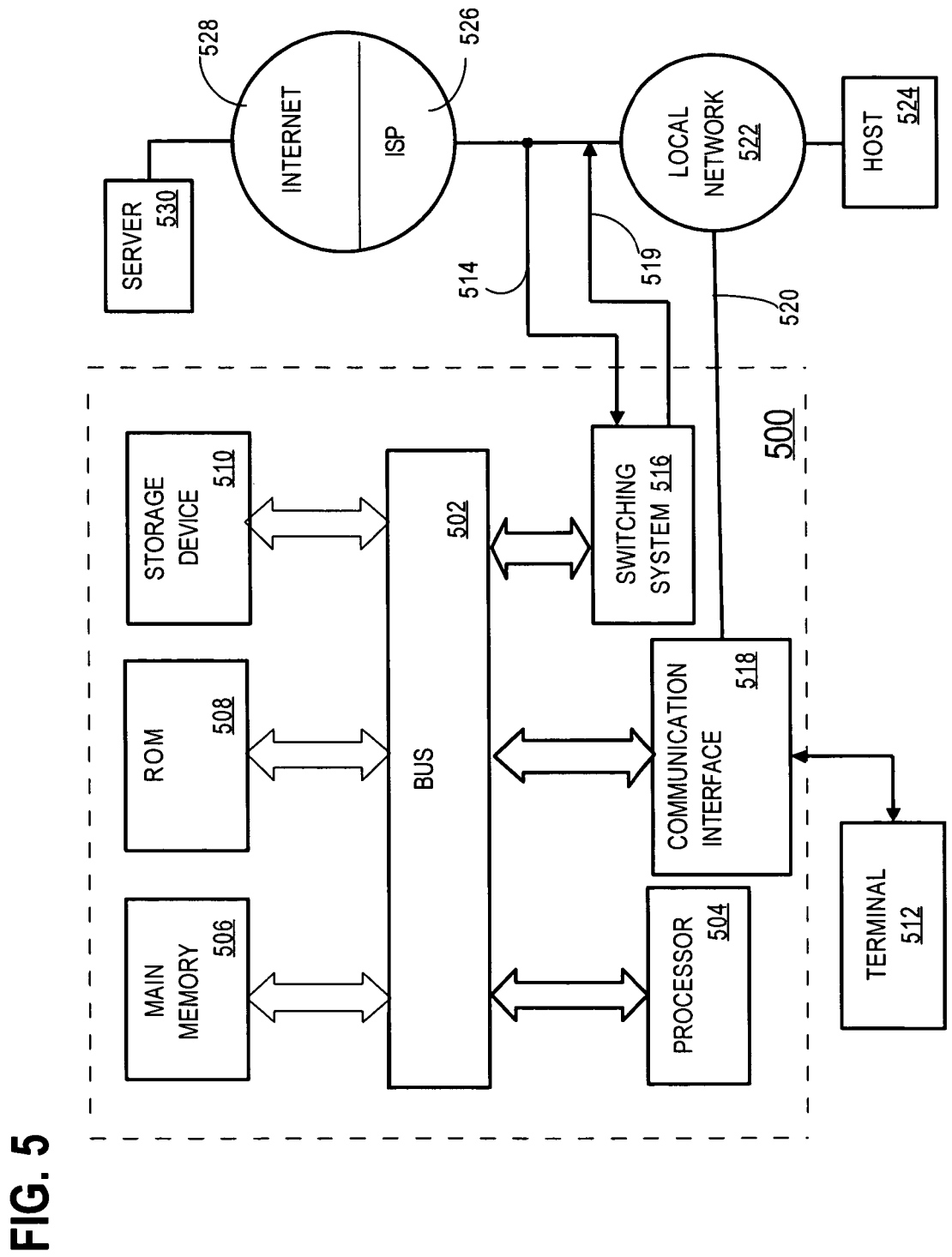
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for synchronizing network transport layer connections. According to one embodiment of the invention, synchronizing network transport layer connections is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions.

The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for synchronizing network transport layer connections as described herein.

Processor 504 may execute the received code as it is received, and/or stored in storage device 510, or other non-volatile storage for later execution. In this manner, computer system 500 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:

receiving, at a router that hosts a master transmission control protocol (TCP) module coupled through an inter-process communication (IPC) facility to a slave TCP module, information identifying a newly created TCP connection maintained at the master TCP module;

assigning a unique connection identifier to the TCP connection;

sending the unique connection identifier, in association with a source address value, destination address value, source port value, and destination port value, to the slave TCP module;

sending, from the master TCP module to the slave TCP module over the IPC facility, one or more messages comprising one or more properties or statistics associated with the transport layer connection, wherein the messages identify the transport layer connection using the unique connection identifier, wherein the messages are not TCP segments;

notifying an application running on the TCP connection that the TCP connection is available;

wherein the master TCP module monitors system behavior to identify events and the slave TCP module uses the events to recreate state data;

wherein the state data recreated in the slave TCP module replicates state data maintained in the master TCP module;

wherein the master TCP module receives a request for state verification, the master TCP module sends a request for statistics to the slave TCP module, the slave TCP module retrieves one or more statistics values, the slave TCP module sends a responsive statistics message comprising the one or more statistics values to the master TCP module, and the master TCP module sends a reply message comprising the statistics values to a logically higher application;

wherein the method is performed by one or more computing devices.

2. A method as recited in claim 1, wherein the notifying comprises sending a message to a dedicated listener port.

3. A method as recited in claim 1, wherein the master TCP module receives one or more TCP segments, replicates the one or more TCP segments, and sends the replicated one or more TCP segments to the slave TCP module, wherein the slave TCP module sends the replicated one or more TCP segments through an input path of the slave TCP module to thereby replicate state data maintained by the master TCP module and associated with the one or more TCP segments.

4. A method, comprising:

receiving, at a network element comprising an active transport protocol process coupled to a standby transport protocol process, information identifying a newly created transport layer connection maintained at the active transport protocol process;

assigning a unique connection identifier to the transport layer connection;

sending the unique connection identifier, in association with other, protocol-specific connection identifying information, to the standby protocol process;

sending, to the standby transport protocol process, one or more messages comprising one or more properties or statistics associated with the transport layer connection, wherein the messages identify the transport layer connection using the unique connection identifier;

wherein the active transport protocol process monitors system behavior to identify events and the standby transport protocol process uses the events to recreate state data;

wherein the state data recreated by the standby transport protocol process replicates state data maintained by the active transport protocol process;

wherein the active transport protocol process receives a request for state verification, the active transport protocol process sends a request for statistics to the standby transport protocol process, the standby transport protocol process retrieves one or more statistics values, the standby transport protocol process sends a responsive statistics message comprising the one or more statistics values to the active transport protocol process, and the active transport protocol process sends a reply message comprising the statistics values to a logically hither application;

wherein the method is performed by one or more computing devices.

5. A method as recited in claim 4, wherein the messages conform to a specified transport protocol synchronization message format and are not TCP segments.

6. A method as recited in claim 4, wherein both the active transport protocol process and the standby transport protocol process implement TCP.

7. A method as recited in claim 4, wherein the protocol-specific connection identifying information comprises a source address value, destination address value, source port value, and destination port value.

8. A method as recited in claim 4, wherein the standby transport protocol process notifies a logically higher application that the transport protocol connection is available only after receiving the one or more messages and an end message that signals an end of the one or more messages.

9. A method as recited in claim 4, wherein the active transport protocol process notifies a logically higher application that the transport protocol connection is available only after receiving a completion message from the standby transport protocol process.

10. A method as recited in claim 4 wherein the one or more messages comprise any of egress properties, ingress properties, rate properties, statistics, or options associated with the transport protocol connection.

11. A network routing apparatus, comprising: an active route processor; a standby route processor that is coupled to the active route processor in a redundant arrangement; a non-transitory computer-readable medium that is accessible to the active route processor and the standby route processor, and comprising one or more sequences of instructions which, when executed by the route processors, cause the route processors to perform the steps of: receiving, at an active transport protocol process coupled to a standby transport protocol process, information identifying a newly created transport layer connection maintained at the active transport protocol process; assigning a unique connection identifier to the transport layer connection; sending the unique connection identifier, in association with other, protocol-specific connection identifying information, to the standby protocol process; sending, to the standby transport protocol process, one or more messages comprising one or more properties or statistics associated with the transport layer connection, wherein the messages identify the transport layer connection using the unique connection identifier; wherein the active transport protocol process receives a request for state verification, the active transport protocol process sends a request for statistics to the standby transport protocol process, the standby transport protocol process retrieves one or more statistics values, the standby transport protocol process sends a responsive statistics message comprising the one or more statistics values to the active transport protocol process, and the transport protocol process sends a reply message comprising the statistics values to a logically higher application.

12. An apparatus as recited in claim 11, wherein the messages conform to a specified transport protocol synchronization message format and are not TCP segments.

13. An apparatus as recited in claim 11, wherein both the active transport protocol process and the standby transport protocol process implement TCP.

14. An apparatus as recited in claim 11, wherein the protocol-specific connection identifying information comprises a source address value, destination address value, source port value, and destination port value.

15. An apparatus as recited in claim 11, wherein the standby transport protocol process notifies a logically higher application that the transport protocol connection is available only after receiving the one or more messages and an end message that signals an end of the one or more messages.

16. An apparatus as recited in claim 11, wherein the active transport protocol process notifies a logically higher application that the transport protocol connection is available only after receiving a completion message from the standby transport protocol process.

17. An apparatus as recited in claim 11 wherein the one or more messages comprise any of egress properties, ingress properties, rate properties, statistics, or options associated with the transport protocol connection.

18. A network routing apparatus, comprising:
one or more processors;
means for receiving, at a network element comprising an active transport protocol process coupled to a standby transport protocol process, information identifying a newly created transport layer connection maintained at the active transport protocol process;
means for assigning a unique connection identifier to the transport layer connection;
means for sending the unique connection identifier, in association with other, protocol-specific connection identifying information, to the standby protocol process;
means for sending, to the standby transport protocol process, one or more messages comprising one or more properties or statistics associated with the transport layer connection, wherein the messages identify the transport layer connection using the unique connection identifier;
wherein the active transport protocol process monitors system behavior to identify events and the standby transport protocol process uses the events to recreate state data;
wherein the state data recreated by the standby transport protocol process replicates state data maintained by the active transport protocol process;
wherein the active transport protocol process receives a request for state verification, the active transport protocol process sends a request for statistics to the standby transport protocol process, the standby transport protocol process retrieves one or more statistics values, the standby transport protocol process sends a responsive statistics message comprising the one or more statistics values to the active transport protocol process, and the active transport protocol process sends a reply message comprising the statistics values to a logically higher application.

19. An apparatus as recited in claim 18, wherein the messages conform to a specified transport protocol synchronization message format and are not TCP segments.

20. An apparatus as recited in claim 18, wherein both the active transport protocol process and the standby transport protocol process implement TCP.

21. An apparatus as recited in claim 18, wherein the protocol-specific connection identifying information comprises a source address value, destination address value, source port value, and destination port value.

22. An apparatus as recited in claim 18, wherein the standby transport protocol process notifies a logically higher application that the transport protocol connection is available only after receiving the one or more messages and an end message that signals an end of the one or more messages.

23. An apparatus as recited in claim 18, wherein the active transport protocol process notifies a logically higher application that the transport protocol connection is available only after receiving a completion message from the standby transport protocol process.

24. An apparatus as recited in claim 18 wherein the one or more messages comprise any of egress properties, ingress properties, rate properties, statistics, or options associated with the transport protocol connection.

25. A non-transitory computer-readable medium carrying one or more sequences of instructions for upgrading network protocol software, which instructions, when executed by one or more processors, cause the one or more processors to carry out the steps of: receiving, at a network element comprising an active transport protocol process coupled to a standby transport protocol process, information identifying a newly created transport layer connection maintained at the active transport protocol process; assigning a unique connection identifier to the transport layer connection; sending the unique connection identifier, in association with other, protocol-specific connection identifying information, to the standby protocol process; sending, to the standby transport protocol process, one or more messages comprising one or more properties or statistics associated with the transport layer connection, wherein the messages identify the transport layer connection using the unique connection identifier; wherein the active transport protocol process monitors system behavior to identify events and the standby transport protocol process uses the events to recreate state data; wherein the state data recreated by the standby transport protocol process replicates state data maintained by the active transport protocol process; wherein the master TCP module receives a request for state verification, the master TCP module sends a request for statistics to the slave TCP module, the slave TCP module retrieves one or more statistics values, the slave TCP module retrieves one or more statistics value, the slave TCP module sends a responsive statistic message comprising the one or more statistics values to the master TCP module, and the master TCP module sends a reply message comprising the statistics values to a logically higher application; wherein the method is performed by one or more computing devices.

26. A non-transitory computer-readable medium as recited in claim 25, wherein the messages conform to a specified transport protocol synchronization message format and are not TCP segments.

27. A non-transitory computer-readable medium as recited in claim 25, wherein both the active transport protocol process and the standby transport protocol process implement TCP.

28. A non-transitory computer-readable medium as recited in claim 25, wherein the protocol-specific connection identifying information comprises a source address value, destination address value, source port value, and destination port value.

29. A non-transitory computer-readable medium as recited in claim 25, wherein the instructions, when executed by the one or more processors, cause the standby transport protocol process to notify a logically higher application that the transport protocol connection is available only after receiving the one or more messages and an end message that signals an end of the one or more messages.

30. A non-transitory computer-readable medium as recited in claim 25, wherein the instructions, when executed by the one or more processors, cause the active transport protocol process to notify logically higher application that the transport protocol connection is available only after receiving a completion message from the standby transport protocol process.

31. A non-transitory computer-readable medium as recited in claim 25, wherein the one or more messages comprise any of egress properties, ingress properties, rate properties, statistics, or options associated with the transport protocol connection.

* * * * *

UNITED STATES PATENT AND TRADEMARK OFFICE
CERTIFICATE OF CORRECTION

PATENT NO. : 7,801,135 B2  Page 1 of 1
APPLICATION NO. : 11/134686
DATED : September 21, 2010
INVENTOR(S) : Chandrashekhar Appanna It is certified that error appears in the above-identified patent and that said Letters Patent is hereby corrected as shown below:

In the claims:

| | |
|---|---|
| Claim 4, column 15, line 64 | Please replace "hither" with --higher-- |
| Claim 11, column 16, line 51 | Between "the" and "transport" please insert --active-- |
| Claim 25, column 18, line 28 | Between "values" and "the" please delete ", the slave TCP module retrieves one or more statistics value" |
| Claim 25, column 18, line 29 | Please replace "statistic" with --statistics-- |
| Claim 25, column 18, line 33 | Please replace ";" with --.-- |
| Claim 25, column 18, line 33 | Please delete "wherein the method is performed by one or more computing devices." |

Signed and Sealed this

Seventh Day of December, 2010

David J. Kappos
*Director of the United States Patent and Trademark Office*